United States Patent [19]
Buffum

[11] 3,749,063
[45] July 31, 1973

[54] FEEDER DISH FOR TRAVELING ANIMALS
[76] Inventor: Edmond E. Buffum, 2293 Sherman Ave., North Bend, Oreg. 97459
[22] Filed: May 26, 1972
[21] Appl. No.: 257,159

[52] U.S. Cl. .............................................. 119/61
[51] Int. Cl. ............................................. A01k 5/00
[58] Field of Search ........................ 119/61, 51, 72; 220/17

[56] References Cited
UNITED STATES PATENTS

| 631,895 | 8/1899 | Littlefield | 119/61 |
| 3,052,215 | 9/1962 | Shold | 119/61 X |
| 2,507,425 | 5/1950 | Swartout | 220/17 X |
| 187,147 | 2/1877 | Jennings | 4/169 |
| 988,715 | 4/1911 | Jaeger | 119/61 |
| 2,520,412 | 8/1950 | Jensen | 126/24 |
| 3,498,268 | 3/1970 | Sleith et al. | 119/61 |

Primary Examiner—Hugh R. Chamblee
Attorney—Harris C. Lockwood

[57] ABSTRACT

A pet feeding dish, particularly suited for use when traveling, comprises a frusto-spherical bowl or container supported by two in line pins attached to opposite sides of the container near the open rim. The pins in turn are pivotally held by a box shaped base weighted with sand or other appropriate material in such manner that the container is free to pivot about the axis of the pins. The rim of the container is also provided with an turned-in lip to reduce spilling of liquids contained therein when the feeder is placed on a swaying platform, such as a ship or boat.

13 Claims, 3 Drawing Figures

PATENTED JUL 31 1973                    3,749,063

FEEDER DISH FOR TRAVELING ANIMALS

BACKGROUND OF THE INVENTION

The present invention relates to a pet feeding dish that will tend to assume a generally horizontal orientation, and thereby reduce spillage of the food or drink contained therein, even when the dish is disposed on a swaying or otherwise moving platform such as a car, ship or boat.

For many years, pet owners who have traveled with their pets have been faced with the problem of feeding their pets in transit. As most such owners will attest, these feedings are generally an unpleasant experience for both the owner and pet, primarily because the pet's feeding dish is jostled about and tipped from a normally horizontal orientation, causing the contents of the dish to spill.

In view of the foregoing, it is an object of the present invention to provide a pet feeding dish that will resist tipping and spilling.

It is another object of the present invention to provide a pet feeding dish whose open top rim will tend to assume a normal horizontal orientation regardless of the orientation of the support on which the dish is placed.

Yet another object of the present invention is to provide a weighted pet feeding dish having a pivotally supported bowl or container, the latter being provided with a turned-in lip for reducing spillage during use.

Another object of the present invention is to provide an inexpensive, durable pet feeding dish particularly suited for use in transit.

Still another object of the present invention is to provide a pet feeding dish which is easily disassembled and cleaned between feedings.

BRIEF DESCRIPTION OF THE DRAWING

These and other objects and advantages of the present invention will be more readily apparent from the following description, taken in conjunction with the accompanying drawing, in which.

DETAILED DESCRIPTION

Figure 1:
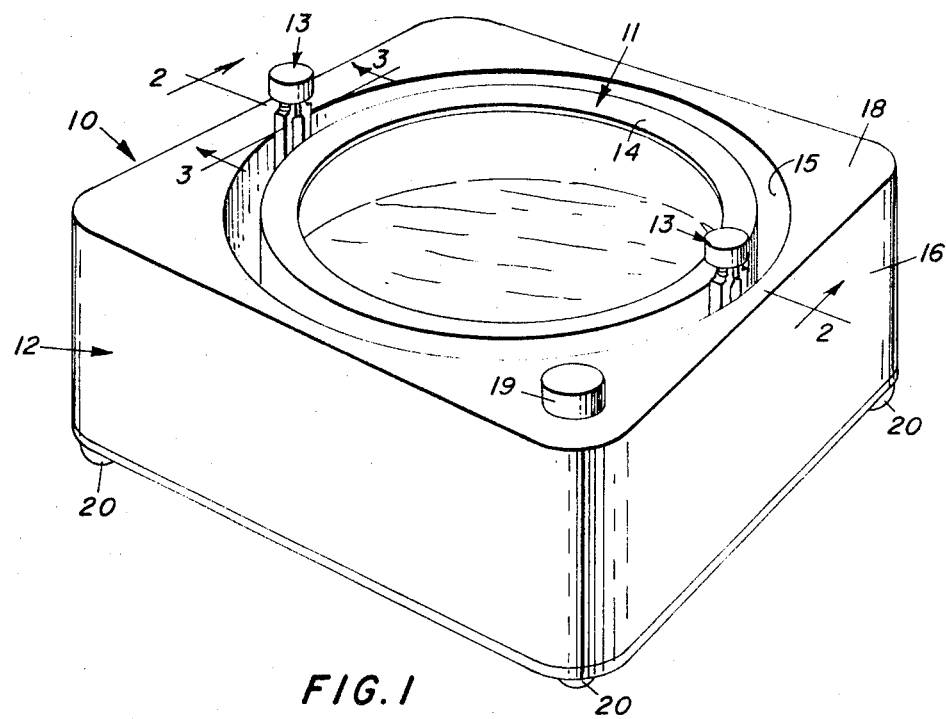
FIG. 1 is a top perspective view of one embodiment of the feeding dish of the present invention.
Figure 2:
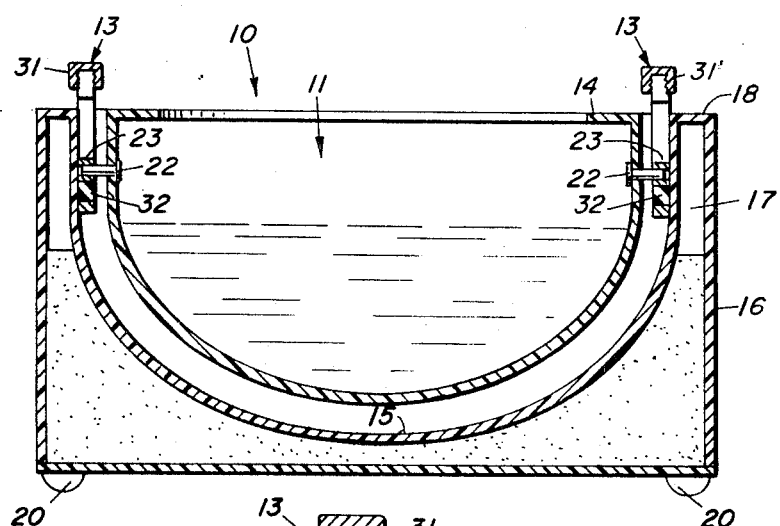
FIG. 2 is a sectional view of the feeding dish generally taken along line 2—2 of FIG. 1.

Referring now to the drawing, and particularly to FIGS. 1 and 2, it will be seen that the invention contemplates a feeding dish 10 comprised of bowl or container portion 11, a base portion 12, and means (designated generally by reference numeral 13 in FIG. 2) for pivotally connecting the container portion 11 to the base portion 12. The connecting means 13 is described in detail hereinbelow.

The bowl or container portion 11 comprises a concave, perferably frusto-spherical member having an open top. In a preferred embodiment, the open top of the container 11 terminates with a turned-in edge or lip 14 which, as will become more apparent, reduces spillage of the contents of the container during use. The container 11 may be formed of any suitable material, such as plastic, metal or the like.

The base portion 12 may comprise a box-like configuration whose outer dimensions are dictated by little other than esthetic considerations. However, it is essential that the base portion comprise an opening or concavity 15 adapted to receive the container portion 11. As illustrated most clearly in FIG. 2, the contour of the concavity 15 preferably corresponds to the outer configuration of the container portion 11. However, the only critical relationship between the configuration of the concavity 15 and that of the container portion 11 is that the concavity be larger than the container to permit the container to pivot freely relative to the base portion 12. As is the case with the container, the base portion may comprise any suitable material of construction. However, it is preferred that the base portion be comprised of rigid wall members 16, which define a cavity or space 17. It is also preferred that the cavity 17 be filled with a weighting material, such as sand or water to impart greater stability to the base portion 12. As shown in FIG. 1, the weighting material may be added to the cavity 17 through a mouth located on the top 18 of the base portion 12. The mouth may be closed, for example, with a threaded cap 19 to prevent inadvertent loss of the weighting material. If desired, the base portion may also be provided with rubber or other non-skid leg members 20 to reduce the tendency of the feeding dish to move during use.

Figure 3:
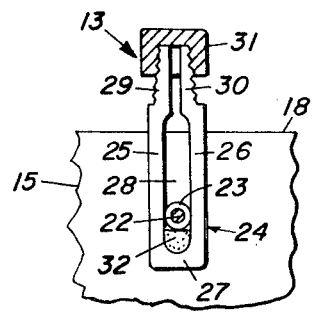
FIG. 3 is a partial sectional view of the feeding dish, taken generally along line 3—3 of FIG. 1.

As best seen in FIGS. 2 and 3, the means 13 for pivotally connecting the container portion 11 to the base portion 12 comprises a pair of diametrically opposed pins or pintles 22 rigidly connected to the container. Each of the pintles 22 is preferably provided with a bushing 23 rotatably mounted at or near the free end thereof. The connecting means 13 also comprises a pair of U-shaped clamping members 24 which are rigidly connected to the base portion 12. As illustrated best in FIG. 3, the legs 25, 26 and bottom 27 of each clamping member 24 defines a generally vertical channel or slot 28 adapted to receive the bushing 23 of one of the pintles 22.

In a preferred embodiment, the top portion 29, 30 of each leg 25, 26 is threaded to receive an internally threaded tightening member 31, such as a hard rubber cap or nut. It will be appreciated, of course, that the threaded portion of each leg 25, 26 is tapered slightly so that the legs 25, 26 will be forced closer to each other with increased threading engagement between the tightening member 31 and the legs 25, 26. Moreover, it will be appreciated that the normal width of the slot, i.e., the width of the slot prior to engaging the tightening member on the legs 25, 26, is slightly larger than the diameter of the bushing 23 (or the diameter of the pintle 22, in the event that dish 10 is to be used without the bushings) to permit vertical movement of the pintles between the legs 25, 26 in the corresponding slots.

In this manner, the container portion 11 can be separated from the base portion 12, for example, when it is desired to clean the container portion 11, merely by removing the tightening member 31 and lifting the container portion vertically upward until the pintles 22 clear the top portions of the legs 25, 26. Then, after the container portion has been cleaned, the dish 10 may be reassembled merely by reversing the above procedure.

In this regard, even when the tightening member is engaged with the legs 25, 26 so as to force the legs against the bushings 23 (or pintles 22) and thereby effect a predetermined restriction of the vertical movement thereof, a limited vertical movement of the bushings (or pintles) can be obtained by disposing a resilient stop member 32 between the bushing (or pintles) and the bottom 27 of the U-shaped clamps. The resilient stop member 32, which may comprise a rubber disc, also provides a soft landing or cushion for the bushings (or pintles).

As will be appreciated from the foregoing description, the pivotal connection between the container portion 11 and the base portion 12, will cause the container portion, under the influence of gravity, to tend to remain in a generally horizontal orientation regardless of the orientation of the base portion.

While this invention has been described in particularity with reference to the preferred form thereof, it will be readily understood by those skilled in the art that further modifications and changes may be made therein without departing from the spirit and scope of the invention.

What is claimed is:

1. A pet feeding dish comprising,
   a container portion having an open top;
   a weighted base portion having a concavity adapted to receive said container portion, said concavity being larger than the outside dimensions of said container portion; and
   means pivotally connecting said container portion to said base portion, said container portion being disposed within said concavity, such that, under the influence of gravity, said container portion will undergo pivotal movement relative to said base portion and thereby tend to assume a generally horizontal orientation.

2. The pet feeding dish of claim 1, wherein said pivotal connecting means comprises a pair of opposed pintles rigidly connected to and extending from said container portion near said open top thereof, and a pair cradle means mounted to said base portion pivotally supporting said pintles.

3. The pet feeding dish of claim 2, wherein each of said cradle means comprises a generally U-shaped clamp member rigidly connected to said base portion, the legs and bottom of said U-shaped member defining a vertically oriented slot for receiving one of said pintles.

4. The pet feeding dish of claim 3, wherein a resilient stop means is disposed on the pintle supporting portion of each of said U-shaped members to provide a resilient contact between said pintles and said pintle support portions.

5. The pet feeding dish of claim 3, further including bushing means mounted at the free end of each pintle, bushing means being disposed in a corresponding vertically oriented slot.

6. The pet feeding dish of claim 5, wherein the top portion of each of said legs of said U-shaped members is tapered and threaded, and further including tightening means having internal threads for threadably engaging said legs, said tightening means causing the top portions of said legs to move closer to each other upon threading engagement, thereby tightening said legs against said bushing means.

7. The pet feeding dish of claim 4, wherein said pintle is mounted within a bushing, said bushing, in turn, being disposed in said vertically oriented slot.

8. The pet feeding dish of claim 7, wherein said base portion comprises a rigid hollow member weighted with sand, and wherein each of said tightening means comprises a threaded rubber cap.

9. The pet feeding dish of claim 8, wherein the open top of said bowl portion comprises a turned-in lip for reducing spillage of liquids contained therein.

10. A pet feeding dish, which comprises:
    a frusto-spherical bowl;
    a rigid, hollow base member having a semi-spherical concavity for receiving said bowl, said concavity being larger than said bowl;
    a first pintle extending outwardly from said bowl and toward said concavity;
    first bushing means rotatably mounted on said first pintle;
    a first U-shaped member connected to said concavity, the legs and bottom of said first U-shaped member defining a slot for receiving and supporting said first bushing means;
    a second pintle extending outwardly from said bowl and toward said concavity, said second pintle being diametrically opposed to said first pintle;
    second bushing means rotatably mounted on said second pintle;
    a second U-shaped member connected to said concavity, the legs and bottom of said second U-shaped member defining a slot for receiving and supporting said second bushing means;
    means for tightening the legs of said first U-shaped member against said first bushing means; and
    means for tightening the legs of said second U-shaped member against said second bushing means, whereby under the influence of gravity, said bowl will pivot about said pintles and tend to remain in a generally horizontal orientation.

11. The pet feeding dish of claim 10, wherein said base member is weighted with sand.

12. The pet feeding dish of claim 10, wherein the top portion of each of said legs is threaded and tapered, and wherein each of said tightening members comprises an internally threaded member adapted to threadably engage the threaded legs of the respective U-shaped members.

13. The pet feeding dish of claim 12, wherein a flexible stop member is disposed between the bushing means and the bushing supporting surface of the respective U-shaped members.

* * * * *